United States Patent
Dawson et al.

(10) Patent No.: US 6,844,296 B2
(45) Date of Patent: Jan. 18, 2005

(54) FRACTURING FLUIDS AND METHODS OF MAKING AND USING SAME

(75) Inventors: Jeffrey C. Dawson, Spring, TX (US); Hoang Van Le, Spring, TX (US)

(73) Assignee: BJ Services Company, Houston, TX (US)

(*) Notice: Subject to any disclaimer, the term of this patent is extended or adjusted under 35 U.S.C. 154(b) by 245 days.

(21) Appl. No.: 10/177,983

(22) Filed: Jun. 21, 2002

(65) Prior Publication Data

US 2003/0083403 A1 May 1, 2003

Related U.S. Application Data

(60) Provisional application No. 60/300,268, filed on Jun. 22, 2001.

(51) Int. Cl.$^7$ ............................. E21B 43/26; C09K 3/00
(52) U.S. Cl. .................. 507/211; 507/209; 507/273; 507/275; 507/903; 507/922; 166/308.5
(58) Field of Search ................................. 507/211, 209, 507/273, 275, 903, 922; 166/308.5, 308

(56) References Cited

U.S. PATENT DOCUMENTS

| | | | | |
|---|---|---|---|---|
| 4,031,307 A | | 6/1977 | DeMartino et al. .......... 536/114 |
| 4,324,668 A | * | 4/1982 | Harris .......................... 507/215 |
| 4,400,502 A | * | 8/1983 | Majewicz ..................... 536/87 |
| 4,477,360 A | | 10/1984 | Almond ....................... 252/8.55 |
| 4,514,309 A | | 4/1985 | Wadhwa ...................... 252/8.55 |
| 4,553,601 A | * | 11/1985 | Almond et al. ............ 166/308.5 |
| 4,566,979 A | * | 1/1986 | Githens ........................ 507/203 |
| 4,635,727 A | | 1/1987 | Anderson et al. ............ 166/308 |
| 5,067,566 A | | 11/1991 | Dawson ....................... 166/308 |
| 5,182,380 A | * | 1/1993 | Breckwoldt et al. .......... 536/90 |
| 5,305,832 A | | 4/1994 | Gupta et al. ................. 166/300 |
| 5,460,226 A | | 10/1995 | Lawson et al. .............. 166/300 |
| 5,552,462 A | | 9/1996 | Yeh .............................. 524/55 |
| 5,566,760 A | | 10/1996 | Harris .......................... 166/308 |
| 5,614,475 A | * | 3/1997 | Moorhouse et al. ......... 507/273 |
| 5,697,444 A | * | 12/1997 | Moorhouse et al. ...... 166/308.5 |
| 5,957,203 A | | 9/1999 | Hutchins et al. ............. 166/295 |
| 5,972,850 A | | 10/1999 | Nimerick ..................... 507/211 |
| 6,017,855 A | | 1/2000 | Dawson et al. .............. 507/209 |
| 6,060,436 A | | 5/2000 | Snyder et al. ................ 507/266 |
| 6,387,853 B1 | * | 5/2002 | Dawson et al. .............. 507/211 |
| 6,486,138 B1 | * | 11/2002 | Asgharian et al. ............ 514/54 |
| 2003/0045708 A1 | * | 3/2003 | Magallanes et al. ......... 536/123 |

FOREIGN PATENT DOCUMENTS

| | | | |
|---|---|---|---|
| WO | WO 96/34179 | 10/1996 | ........... E21B/43/26 |
| WO | WO 98/54272 | 12/1998 | ............. C09K/7/02 |

OTHER PUBLICATIONS

Tjon–Joe–Pin, Robert M., Brannon, Harold D.; BJ Services Co. USA; Handren, Patrick J.; Oryx Energy Company; "Improved Fracturing Technologies Provide for Increased Well Productivity; A Case Study on Red Fork Formation Wells" *Society of Petroleum Engineers, Inc.*, 1995.

Brannon, Harold D., SPE, Tjon–Joe–Pin, Robert M., SPE, BJ Services Company; "Characterization of Breaker Efficiency Based Upon Size Distribution of Polymeric Fragments Resulting from Degradation of Crosslinked Fracturing Fluids" *Society of Petroleum Engineers, Inc.*, 1996.

International Search Report dated Oct. 11, 2002.

* cited by examiner

*Primary Examiner*—Philip C. Tucker
(74) *Attorney, Agent, or Firm*—Howrey Simon Arnold & White, LLP

(57) ABSTRACT

Fracturing fluid compositions and methods for their preparation and use are disclosed. The compositions are useful in the oil and gas drilling operations, as well as in gravel packing operations, water blocking, temporary plugging for purposes of wellbore isolation and/or fluid loss control, and other uses. The compositions comprise a liquid, a polymer soluble in the liquid, having a degree of substitution of ionic groups of about 0.01 to about 0.1; and a crosslinking agent capable of increasing the viscosity of the fracturing fluid by crosslinking the polymer in liquid.

47 Claims, No Drawings

FRACTURING FLUIDS AND METHODS OF MAKING AND USING SAME

CROSS REFERENCE TO RELATED APPLICATIONS

The present application is related to U.S. Provisional Patent Application Ser. No. 60/300,268 filed Jun. 22, 2001, the contents of which are incorporated herein by reference.

FIELD OF THE INVENTION

The invention relates to methods and compositions for treating subterranean formations. More particularly, it relates to methods and compositions for treating a subterranean formation penetrated by a wellbore into which a gel with a high viscosity is injected.

BACKGROUND OF THE INVENTION

Viscous well treatment fluids are commonly utilized in the drilling, completion, and treatment of subterranean formations penetrated by wellbores. A viscous well treatment fluid is generally composed of a polysaccharide or synthetic polymer in an aqueous solution which is crosslinked by metallic compounds. Examples of well treatments in which metal-crosslinked polymers are used are hydraulic fracturing, gravel packing operations, water blocking, and other well completion operations.

Hydraulic fracturing techniques are widely employed to enhance oil and gas production from subterranean formations. During hydraulic fracturing, a proppant-laden fluid is injected into a well bore under high pressure. Once the natural reservoir pressures are exceeded, the fracturing fluid initiates a fracture in the formation which generally continues to grow during pumping. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In formulating a fracturing fluid, several factors generally are considered. First, the fracturing fluid should preferably have sufficient viscosity to create suitable fracture geometry. Generally, most treatments are designed to obtain a specified fracture length. In addition to fracture length, it is also common to create a fracture that has a width at least three times greater than the largest proppant size. Typically, the viscosity of a fracturing fluid is designed to satisfy the requirements of both the fracture length and fracture width. Second, the viscosity of a fracturing fluid should preferably be high enough for the fluid to adequately transport the proppant from the surface to the fracture. Suitable fluids are those which can suspend the proppant with minimal settling. Third, a fracturing fluid should preferably have minimal fluid loss to the formation.

Multiple patents and publications have attempted to prepare a fracturing fluid with a combination of these desirable features.

U.S. Pat. No. 4,477,360 suggests the use of an aqueous gel containing a zirconium salt and a polyhydroxyl-containing compound. The gel is suggested for use in fracturing fluids, and has a high viscosity. The polyhydroxyl compounds have 3 to 7 carbon atoms, and a preferred compound is glycerol. Gelling agents include various polysaccharides.

U.S. Pat. No. 4,635,727 offers methods of fracturing a subterranean formation using a base guar gum gel and a crosslinking system. A preferred crosslinking system includes zirconium lactate and aluminum chlorohydrate.

U.S. Pat. No. 5,305,832 proposes methods for using crosslinked guar polymers at a pH such that the cationic charge density of the polymer is at its maximum. The pH is chosen to minimize thermal degradation and to minimize polymer gel loading. The pH varied depending on the polymer used, but were typically in the range of about 10 to about 12.

U.S. Pat. No. 5,972,850 offers an aqueous metal hydrated galactomannan gum buffered to pH 9 to 11, and methods for its use in fracturing a subterranean formation. Metal ions suggested to crosslink the galactomannan gum include boron, zirconium, and titanium ions.

U.S. Pat. No. 6,017,855 suggests methods for fracturing subterranean formations using fluids having reduced polymer loadings. The fluids contain modified polymers having randomly distributed anionic substituents. The polymers can be crosslinked to form viscous gels that are stable at low polymer concentrations. Modification of the polymers lead to lowered $C^*$ concentrations (the concentration necessary to cause polymer chain overlap).

U.S. Pat. No. 6,060,436 proposes the use of borate ion crosslinked galactomannan gums in fracturing fluids. The crosslinking is delayed by release of borate ions from a polyol complex.

SPE 29446 (1995) discusses field results of well treatment with borate-crosslinked or titanate-crosslinked systems. Performance was observed to improve with the following treatments, in increasing order of improvement: titanate-crosslinked fluids, borate-crosslinked fluids, organoborate-crosslinked fluids, and organoborate-crosslinked fluids with a guar-specific enzyme breaker. Organoborates were offered as providing stronger crosslink junctions, greater elasticity, high viscosity, and reduced polymer loadings.

SPE 36496 (1996) offers the characterization of breaker efficiency by determining the size distribution of degraded polymer fragments. Reduced viscosity was discussed as not being fully indicative of molecular weight reduction. For example, the use of oxidative breakers is capable of reducing gel viscosity, but is relatively ineffective to reduce the polymer molecular weight. Guar specific enzymes were found to provide the most efficient molecular weight reduction of crosslinked fluids.

The success of a hydraulic fracturing treatment, in part, depends upon the creation of a high-permeability fracture. The long term production of a well is directly related to fracture conductivity, which is dependent upon the fracturing fluid used during the treatment and the cleanup of the fracturing fluid after the treatment. Excessive amounts of polymer gels and other insoluble residues may significantly reduce fracture conductivity. Therefore, there is a need for a fracturing fluid and a method of treating a subterranean formation which would result in good fracture conductivity.

SUMMARY OF THE INVENTION

The instant invention is generally directed towards fracturing fluids and methods for their use. Fracturing fluids disclosed herein comprise a liquid, a polymer soluble in the liquid, having a degree of substitution of ionic groups of about 0.01 to about 0.1, and a crosslinking agent capable of increasing the viscosity of the fracturing fluid by crosslinking the polymer in liquid.

Particular embodiments of the fracturing fluids display reversible cross-linking, allowing removal of the fracturing fluid once a well treatment is completed. The change in cross-linking can be accomplished by methods such as changing the pH.

Use of the disclosed fracturing fluids can result in improved fracture conductivity, reduced polymer loading, and causation of less formation damage than would be observed using conventional fracturing fluids.

DETAILED DESCRIPTION OF THE INVENTION

Embodiments of the invention provide a fracturing fluid and a method of making and using the fracturing fluid to treat subterranean formations. The fracturing fluid can also be used in applications other than fracturing, such as gravel packing operations, water blocking, temporary plugs for purposes of wellbore isolation and/or fluid loss control, etc. Most fracturing fluids are aqueous based, although non-aqueous fluids may also be formulated and used.

One embodiment of the invention is directed towards fracturing fluids comprising a liquid, a polymer soluble in the liquid, having a degree of substitution of ionic groups of about 0.01 to about 0.1, and a crosslinking agent capable of increasing the viscosity of the fracturing fluid by crosslinking the polymer in liquid.

The liquid can generally be any liquid. A presently preferred liquid is water, or an aqueous solution. The aqueous solution can comprise various salts, solvents (e.g. alcohols), polymers, polysaccharides, or other materials. The aqueous solution can further comprise suspended or dispersed materials.

An aqueous fracturing fluid may be prepared by blending a hydratable or water-dispersible polymer with an aqueous fluid. The aqueous fluid can be, for example, water, brine, or water-alcohol mixtures. Any suitable mixing apparatus may be used for this procedure. In the case of batch mixing, the hydratable polymer and aqueous fluid are blended for a period of time which is sufficient to form a hydrated sol.

The polymer can be cationic or anionic. Preferably, it is an anionic polymer, such as a carboxylate-substituted guar polymer with a degree of substitution of carboxylate groups from about 0.01 to about 0.1. The degree of substitution can be about 0.01, about 0.02, about 0.03, about 0.04, about 0.05, about 0.06, about 0.07, about 0.08, about 0.09, or about 0.10, or any range between any two of these values.

The phrase "degree of substitution", as used herein, refers to the average number of ionic groups attached or bonded to a repeating unit of a polymeric backbone. For a guar polymer, the basic repeating unit for the polymer includes two mannose units with one glycosidic linkage and a galactose unit attached to a hydroxyl group of one of the mannose units. On average, each of the anhydro sugar units contains three available hydroxyl sites which can be substituted by an ionic group, such as a carboxylate group. A degree of substitution of three would mean that all of the available hydroxyl sites have been substituted. A degree of substitution ("DS") of 0.02 means that one ionic group is statistically added to every fifty sugar units, and a DS of 0.04 means that one ionic group per every twenty five sugar units. Preferably, the degree of substitution of a suitable polymer should be in the range from about 0.01 to about 0.12, more preferably from about 0.02 to about 0.10 or from 0.04 to about 0.09. In some embodiments, the degree of substitution ranges from about 0.03 to about 0.06 or from about 0.04 to about 0.05. Although these ranges are preferred, polymers with a degree of substitution outside these ranges may also be used in embodiments of the invention. In addition to ionic substitution, a suitable polymer may optionally include one or more neutral groups, such as hydrocarbyl groups. However, "degree of substitution" refers only to those ionic substitutions. Therefore, it does not include the substitution of neutral groups.

Suitable anionic groups include, but are not limited to, carboxylate groups, carboxyalkyl groups, carboxyalkyl hydroxyalkyl groups, sulfate groups, sulfonate groups, amino groups, amide groups, or any combination thereof. An alkyl group includes any hydrocarbon radical, such as methyl, ethyl, propyl, butyl, pentyl, hexyl, heptyl, octyl, etc.

Suitable cationic groups for attachment to the polymer include, but are not limited to, quaternary ammonium groups. Typical of quaternary ammonium groups are methylene trimethylammonium chloride, methylene trimethylammonium bromide, benzyltrimethylammonium chloride and bromide, ethylene triethylammonium chloride, ethylene triethylammonium bromide, butylene tributylammonium chloride, butylene tributylammonium bromide, methylenepyridinium chloride, methylenepyridinium bromide, benzylpyridinium chloride, benzylpyridinium bromide, methylene dimethyl-p-chlorobenzylammonium chloride, methylene dimethyl-p-chlorobenzylammonium bromide, and the like, wherein each of the groups is derivatized in the form of a radical which is substituted in a hydrocolloid gelling agent by means of an alkylene or oxyalkylene linkage. Exemplary cationic polymers are polygalactomannan gums containing quaternary ammonium ether substituents as described in U.S. Pat. No. 4,031,307.

Cationic derivatives of guar gum or locust bean gum can be prepared, for example, by contacting solid guar gum or locust bean gum with a haloalkyl-substituted quaternary ammonium compound and a stoichiometric excess of alkali metal hydroxide or ammonium hydroxide in a reaction medium comprising an aqueous solution of water-miscible solvent, at a temperature of about 10° C. and about 100° C. for a reaction period sufficient to achieve a degree of substitution by quaternary ammonium ether groups between about 0.01 and about 0.1. The solid guar gum or other polygalactomannan which is etherified can be in the form of endosperm splits or in the form of finely divided powder which is derived from the endosperm splits. Preferably, the polygalactomannan gum which is etherified with quaternary ammonium groups should remain as a solid phase in the reaction medium during the reaction period.

Examples of commercially available polygalactomannans with one or more substituted cationic quaternary ammonium groups include Jaguar C-13, Jaguar C-13S, Jaguar C-14, Jaguar C-17 and Jaguar C-14S (all commercially available by Rhone-Poulenc Inc.). Other suitable cationic polymers include those which contain other cationic groups such as acid salts of primary, secondary, and tertiary amines, sulfonium groups or phosphonium groups. Additional suitable cationic polymers are disclosed in U.S. Pat. No. 5,552,462 and No. 5,957,203.

Suitable hydratable polymers that may be used in embodiments of the invention include any of the hydratable polysaccharides which are capable of forming a gel in the presence of a crosslinking agent and have anionic groups to the polymer backbone. For instance, suitable hydratable polysaccharides include, but are not limited to, anionically substituted galactomannan gums, guars, and cellulose derivatives. Specific examples are anionically substituted guar gum, guar gum derivatives, locust bean gum, Karaya gum, carboxymethyl cellulose, carboxymethyl hydroxyethyl cellulose, and hydroxyethyl cellulose substituted by other anionic groups. More specifically, suitable polymers include, but are not limited to, carboxymethyl guar, carboxyethyl guar, carboxymethyl hydroxypropyl guar, and carboxymethyl hydroxyethyl cellulose. Additional hydratable polymers may also include sulfated or sulfonated guars, cationic guars derivatized with agents such as 3-chloro-2-hydroxypropyl trimethylammonium chloride, and synthetic polymers with anionic groups, such as polyvinyl acetate, polyacrylamides, poly-2-amino-2-methyl propane sulfonic acid, and various other synthetic polymers and copolymers. Moreover, U.S. Pat. No. 5,566,760 discloses a class of hydrophobically modified polymers for use in fracturing fluids. These hydrophobically modified polymers may be used in embodiments of the invention with or without modification. Other suitable polymers include those known or unknown in the art.

The polymer may be present in the fluid in concentrations ranging from about 0.05% to about 5.0% by weight of the aqueous fluid. The polymer can be present at about 0.1%, about 0.2%, about 0.3%, about 0.4%, about 0.5%, about 0.6%, about 0.7%, about 0.8%, about 0.9%, about 1%, about 2%, about 3%, about 4%, about 5%, or at any range between any two of these values. Suitable ranges for the hydratable polymer include from about 0.20% to about 0.80% by weight or from about 0.12% to about 0.24% by weight. In some embodiments, about 20 pounds or less of a polymer is mixed with 1000 gallons of an aqueous fluid (2.4 kg per 1000 liters). For example, about 5, about 10, or about 15 pounds of a polymer may be mixed with 1000 gallons of an aqueous fluid (0.6, 1.2, or 1.8 kg per 1000 liters). Under certain circumstances, it is more advantageous to have reduced polymer loading (i.e., a polymer concentration of 0.24 wt. % or less or 20 ppt or less). This is because less damage would occur to a formation if a reduced level of polymers is used in a fracturing fluid. An additional benefit of reduced polymer loading may be increased fracture conductivity. Although it may be beneficial to employ polymers at a reduced level, a fracturing fluid may be formulated at a higher polymer level. For example, about 20 pounds or higher of a polymer may be mixed with 1000 gallons of an aqueous fluid (2.4 kg per 1000 liters). Specifically, about 25 pounds, about 30 pounds, about 35 pounds, about 40 pounds, about 45 pounds, about 50 pounds, about 55 pounds, or about 60 pounds of a polymer may be mixed with 1000 gallons of an aqueous fluid (3, 3.6, 4.2, 4.8, 5.4, 6, 6.6, or 7.2 kg per 1000 liters). In some embodiments, about 65 pounds or more of a polymer may be mixed with 1000 gallons of an aqueous fluid (7.8 kg per 1000 liters).

In some embodiments, the polymer is characterized by a relatively low $C^*$ concentration. The critical overlap concentration, $C^*$, of a polymer solution is that concentration of polymer at which the individual coils of polymer just begin to overlap its nearest neighbors. The $C^*$ concentration is inversely proportional to the radius of gyration of the polymer coil. The larger the polymer coil, the lower the $C^*$ value. Thus, the $C^*$ concentration is a measure of the degree of polymer expansion and is affected by the polymer molecular weight, the amount and location of ionic substituents on the polymer chain and the polymer-solvent interactions. This concentration is relatively important if the polymer solution is to be gelled by crosslinking. The probability of intermolecular crosslinking is significant at polymer concentrations above the $C^*$ concentration, requiring the minimum polymer concentration to be greater than the $C^*$ concentration.

The $C^*$ concentration can be determined by measuring the viscosity of several polymer solutions of varying polymer concentration. These solution concentrations should vary from the dilute range to the semi-dilute range. The concentration is plotted as a function of the viscosity and a straight line is fitted to the dilute polymer solutions and to the semi-dilute solutions. The intersection of the two straight lines is the concentration defined as the $C^*$ concentration.

The $C^*$ concentration is also related to the intrinsic viscosity of the polymer solution. The following relationships between $C^*$ and intrinsic viscosity have been obtained but with different coefficients.

$$C^* = k/[n]$$

wherein [n] is the intrinsic viscosity, and k may vary from 1 to 4.

For ionically substituted guar, k is about 2. Therefore, the equation can be written as follows.

$$C^* = 2/[n]$$

The determination is started by hydrating a polymer stock solution made with $2.5 \times 10^{-2}$ g/dl and diluting to yield five concentrations ranging from about $5.0 \times 10^{-3}$ g/dl to $2.5 \times 10^{-2}$ g/dl. The measurements are made in a Canon Fenske 100-tube viscometer at 80° F. (27° C.). The time of the solvent and each solution is recorded, and the reduced viscosity is determined by the following equation, where $\mu_{Red}$ is the reduced viscosity.

$$\mu_{Red} = (Time_{Solution} - Time_{solvent})/(Time_{Solvent} * Concentration)$$

The line is extrapolated to zero concentration, and the reduced viscosity at zero concentration is the intrinsic viscosity. The $C^*$ is then determined from the following equation.

$$C^* \ 2/[n]$$

Additional information on $C^*$ concentration can be found in the following references: 1) John D. Ferry, Viscoelastic Properties of Polymers, John Wiley and Sons, New York; 2) P. G. De Gennes, "Dynamics of Entangled Polymer Solutions. I. The Rouse Model", Macromolecules, Vol. 9, No. 4;3) M. Adam and M. Delsanti, "Dynamical Properties of Polymer Solutions in Good Solvents by Rayleigh Scattering Experiments", Macromolecules, Vol. 10, No. 6;4) Robert Simha and J. L. Zakin, "Compression of Flexible Chain Molecules in Solution", Journal of Chemical Physics, Vol. 33, No. 6; and 5) William Graessley, "The Entanglement Concept in Polymer Rheology", Advances in Polymer Science, Vol. 16, Springer-Verlag, New York, 1974.

Generally, the $C^*$ concentration for guar polymers is in the range from about 0.19 to about 0.22 weight percent. Polymers used in the instant invention preferably have a $C^*$ concentration of less than about 0.18 weight percent. A presently preferred $C^*$ range is about 0.13 weight percent to about 0.07 weight percent, and more preferred is about 0.12 weight percent to about 0.08 weight percent. Specific examples of suitable $C^*$ values include about 0.17 weight percent, about 0.16 weight percent, about 0.15 weight percent, about 0.14 weight percent, about 0.13 weight percent, about 0.12 weight percent, about 0.11 weight percent, about 0.10 weight percent, about 0.09 weight percent, about 0.08 weight percent, and about 0.07 weight percent. Ranges of C* using any two of these specific examples can also be used. Other C* concentration values are also suitable.

The cross-linking agent can generally be any cross-linking agent. The cross-linking agent preferably should be a boron-containing compound, such as a borate compound.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including aluminum, antimony, zirconium, and titanium containing compounds. An example of an antimony crosslinking agent is an alkalki pyroantimonate such as potassium pyroantimonate. Other antimony compounds useful as a crosslinking agent are disclosed, for example, in *Advanced inorganic Chemistry*, pages 382–443, by F. Albert Cotton and Geoffrey Wilkinson, (5$^{th}$ Ed., 1988). Other known and unknown antimony crosslinking agents may also be used.

One class of suitable crosslinking agents is organotitanates. Another class of suitable crosslinking agents is borates as described, for example, in U.S. Pat. No. 4,514,309. The selection of an appropriate crosslinking agent can depend upon the type of treatment to be performed and the hydratable polymer to be used. The amount of the crosslinking agent used also depends upon the well conditions and the type of treatment to be effected, but is generally in the range of from about 0.0005 to about 0.1 part, more preferably from about 0.002 to about 0.05 part, by weight of the active crosslinking agent per 100 parts by weight of the aqueous fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

In accordance with some embodiments of the invention, it was discovered that a fracturing fluid containing about 20 ppt or less of a polymer with a degree of substitution of ionic groups between about 0.01 to about 0.1 could be cross-linked by a boron-containing compound or other crosslinking agents. A preferred class of boron-containing compounds is those capable of providing borate ions in an aqueous solution. One advantage of using a borate cross-linking agent is that the cross-linking is reversible when the pH of the fracturing fluid declines to below about 7.5. Due to the reversibility, the fracturing fluid may be easily removed after a well treatment is completed. Consequently, borate cross-linked fracturing fluids can provide relatively higher fracture conductivity, especially when compared to zirconium cross-linked fracturing fluids under similar conditions.

Industry experience has shown that, under certain conditions, borate ions do not appreciably cross-link highly carboxylated guar polymers, i.e., polymers with a high degree of substitution of carboxylate groups or other anionic groups. However, when the level of anionic substitution or carboxylation is reduced to a degree of substitution of about 0.1 or less, borate ions can effect the cross-linking the polymer to increase the viscosity without significantly adversely affecting the polymer expansion. "Polymer expansion", disclosed in U.S. Pat. No. 6,017,855, refers to the phenomena that, due to anionic substitution, the polymer chains tend to expand to a larger extent in an aqueous fluid than a polymer without such anionic substitution. As a result of polymer expansion, reduced polymer loading (i.e., a polymer concentration of about 20 ppt or less) may be used in a fracturing fluid but still achieving relatively high viscosity levels. Therefore, the benefits of reduced polymer loading and increased fracture conductivity can be obtained simultaneously, if desired.

Any boron-containing compound which is capable of yielding borate ions in solution may be used in embodiments of the invention. Suitable borates include, but are not limited to, boric acid, boric oxide, alkali metal borate (e.g., sodium borate or sodium tetraborate), alkaline earth metal borate, or a mixture thereof. Suitable borate compounds include, but are not limited to, the minerals listed in Table 1 below.

TABLE 1

Borate compounds

| Name | Chemical formula |
|---|---|
| probertite | $NaCaB_5O_9 \cdot 5H_2O$ |
| ulexite | $BaCaB_5O_9 \cdot 8H_2O$ |
| nobleite | $CaB_6O_{10} \cdot 4H_2O$ |
| growerite | $CaB_6O_{10} \cdot 5H_2O$ |
| frolovite | $CaB_4O_8 \cdot 7H_2O$ |
| colemanite | $CaB_6O_{11} \cdot 5H_2O$ |
| meyerhofferite | $CaB_6O_{11} \cdot 7H_2O$ |
| inyoite | $CaB_6O_{11} \cdot 13H_2O$ |
| priceite | $CaB_{10}O_{19} \cdot 7H_2O$ |
| tertschite | $Ca_4B_{10}O_{19} \cdot 20H_2O$ |
| ginorite | $Ca_2B_{14}O_{23} \cdot 8H_2O$ |
| pinnoite | $MgB_2O_4 \cdot 3H_2O$ |
| paternoite | $MgB_8O_{13} \cdot 4H_2O$ |
| kurnakovite | $Mg_2B_6O_{11} \cdot 15H_2O$ |
| inderite | $MgB_6O_{11} \cdot 15H_2O$ |
| preobrazhenskite | $Mg_3B_{10}O_{18} \cdot 4\frac{1}{2} H_2O$ |
| hydroboracite | $CaMgB_6O_{11} \cdot 6H_2O$ |
| inderborite | $CaMgB_6O_{11} \cdot 11H_2O$ |
| kaliborite | $KMg_2B_{11}O_{19} \cdot 9H_2O$ |
| veatchite | $SrB_6O_{10} \cdot 2H_2O$ |

A suitable borate cross-linking agent may be used in any amount to effect the cross-linking and, thus, to increase the viscosity of a fracturing fluid. The concentration of a borate cross-linking agent generally is dependent upon factors such as the temperature and the amount of the polymer used in a fracturing fluid. Normally, the concentration may range from about 5 ppm to about 500 ppm. A borate cross-linking agent may be used in any form, such as powder, solution, or granule. Encapsulated borates may also be used. Encapsulated borate may be prepared by providing a hydrocarbon-based enclosure member which envelopes a breaking agent. Encapsulation may be accomplished by the method described in U.S. Pat. No. 4,919,209. A delayed cross-linking system may also be used in embodiments of the invention. U.S. Pat. No. 5,160,643, No. 5,372,732, and 6,060,436 disclose various delayed borate cross-linking system that can be used in embodiments of the invention. Additional suitable borate cross-linking agents are disclosed in the following U.S. Pat. No. 4,619,776; No. 5,082,579, No. 5,145,590, No. 5,372,732; No. 5,614,475; No. 5,681,796; No. 6,060,436; and No. 6,177,385.

When desired, it is possible to combine a borate compound with a zirconium compound or titanium compound as cross-linking agents, for example, in a manner disclosed in U.S. Pat. No. 5,165,479. However, when a relatively higher fracture conductivity is desired, cross-linking agents (e.g., zirconium cross-linking agents) which cause reduced fracture conductivity are not used with a borate cross-linking agent. Under these circumstances, only those cross-linking agents which do not adversely affect the fracture conductivity (e.g., borate cross-linking agents) are used in a fracturing fluid.

The pH of an aqueous fluid which contains a hydratable polymer can be adjusted if necessary to render the fluid compatible with a crosslinking agent. Desirable pH ranges for a fluid depend upon the type of a crosslinking agent used. When a borate crosslinking agent is used, suitable pH ranges are greater than about 7, for example from about 8 to about 11. On the other hand, for an antimony crosslinking agent, suitable pH ranges are from about 3 to about 6.

To obtain a desired pH value, a pH adjusting material preferably is added to the aqueous fluid after the addition of the polymer to the aqueous fluid. Typical materials for adjusting the pH are commonly used acids, acid buffers, and mixtures of acids and bases. For example, hydrochloric acid, fumaric acid, sodium bicarbonate, sodium diacetate, potassium carbonate, sodium hydroxide, potassium hydroxide, and sodium carbonate are typical pH adjusting agents. Acceptable pH values for the fluid may range from acidic, neutral, to basic, i.e., from about 0.5 to about 14. In some embodiments, the pH is kept neutral or basic, i.e., from about 7 to about 14, more preferably about 8 to about 12. In other embodiments, suitable pH ranges include, but are not limited to, about 9 to about 11, between about 7 to about 11, between about 7 to about 12, about 5 to about 9, about 3 to about 10, or about 6 to about 9. In still other embodiments, a fracturing fluid may have an initial pH of less than about 7.5, such as about 3.5, about 5, or about 5.5. The pH may then be increased to above 7.5, such as about 8.5 to about 11. After the treatment, the pH may be decreased to less than about 7.5. It is also possible to have a pH outside the above ranges. Therefore, a fracturing fluid may be acidic, neutral, or basic, depending on how it is used in well treatments.

The viscosity of the fracturing fluid can generally be any viscosity, and may be selected depending on the particular conditions encountered. The viscosity can be at least about 100 cP at 40 sec$^{-1}$, at least about 150 cP at 40 sec$^{-1}$, at least about 200 cP at 40 sec$^{-1}$, at least about 250 cP at 40 sec$^{-1}$, or at least about 300 cP at 40 sec$^{-1}$, or any range between any of two of these values.

Optionally, the fracturing fluid may further include various other fluid additives, such as pH buffers, biocides, stabilizers, propping agents (i.e., proppants), mutual solvents, and surfactants designed to prevent emulsion with formation fluids, to reduce surface tension, to enhance load recovery, and/or to foam the fracturing fluid. The fracturing fluid may also contain one or more salts, such as potassium chloride, magnesium chloride, sodium chloride, calcium chloride, tetramethyl ammonium chloride, and mixtures thereof. Common clay stabilizers that may be used in the fracturing fluid include, but are not limited to, KCl, quartenary ammonium salts, etc. Ammonium salts which have four alkyl groups bonded to nitrogen are call quartenary ammonium salts. The four alkyl groups may be the same or different. Preferably, they are $C_1$–$C_8$ alkyl groups, e.g., methyl, ethyl, propyl, butyl, pentyl, hexyl, heptyl, and octyl groups. Suitable anions in the salts include, but are not limited to, chloride, fluoride, iodide, bromide, acetate, etc. An example of an quartenary ammonium salt is tetramethyl ammonium chloride.

The fracturing fluid in accordance with embodiments of the invention may further comprise a breaking agent or a breaker. The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Both organic oxidizing agents and inorganic oxidizing agents have been used as breaking agents. Any breaking agent or breaker, both inorganic and organic, may be used in embodiments of the invention. Examples of organic breaking agents include, but are not limited to, organic peroxides, and the like.

Examples of inorganic breaking agents include, but are not limited to, persulfates, percarbonates, perborates, peroxides, chlorites, hypochlorites, oxides, perphosphates, permanganates, etc. Specific examples of inorganic breaking agents include, but are not limited to, ammonium persulfates, alkali metal persulfates, alkali metal percarbonates, alkali metal perborates, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, alkali metal chlorites, alkali metal hypochlorites, $KBrO_3$, $KClO_3$, $KIO_3$, sodium persulfate, potassium persulfate, and so on. Additional suitable breaking agents are disclosed in U.S. Pat. No. 5,877,127; No. 5,649,596; No. 5,669,447; No. 5,624,886; No. 5,106,518; No. 6,162,766; and No. 5,807,812.

In addition, enzymatic breakers may also be used in place of or in addition to a non-enzymatic breaker. Examples of suitable enzymatic breakers are disclosed, for example, in U.S. Pat. No. 5,806,597 and No. 5,067,566. A breaking agent or breaker may be used as is or be encapsulated and activated by a variety of mechanisms including crushing by formation closure or dissolution by formation fluids. Such techniques are disclosed, for example, in U.S. Pat. No. 4,506,734; No. 4,741,401; No. 5,110,486; and No. 3,163,219. In some embodiments, an inorganic breaking agent is selected from alkaline earth metal or transition metal-based oxidizing agents, such as magnesium peroxides, zinc peroxides, and calcium peroxides. Other suitable breakers include the ester compounds disclosed in U.S. Provisional Patent Application Ser. No. 60/260,442, filed on Jan. 9, 2001.

As described above, propping agents or proppants may be added to the fracturing fluid, which is typically done prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 pounds per gallon (about 0.1 to about 1 kg/l) of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, etc.

The fracturing fluids described above in accordance with various embodiments of the invention have many useful applications. For example, it may be used in hydraulic fracturing, gravel packing operations, water blocking, temporary plugs for purposes of wellbore isolation and/or fluid loss control, and other well completion operations. One application of the fracturing fluid is in hydraulic fracturing.

Accordingly, an additional embodiment of the invention is directed towards methods for treating a subterranean formation. The methods can comprise: obtaining a fracturing fluid comprising a liquid, a polymer soluble in the liquid, having a degree of substitution of ionic groups of about 0.01 to about 0.1, and a crosslinking agent capable of increasing the viscosity of the fracturing fluid by crosslinking the polymer in liquid; and injecting the fracturing fluid into a bore hole to contact at least a portion of the subterranean formation. The "obtaining" step can involve obtaining the fracturing fluid pre-mixed from a third party, or can involve mixing the various components prior to the injection step. The fracturing fluid can generally be any of the fracturing fluids discussed above. The liquid can be water. The polymer can be carboxymethyl guar, carboxyethyl guar, carboxypropyl guar, carboxymethyl hydroxypropyl guar, carboxymethyl hydroxyethyl guar, carboxymethyl methyl guar, salts thereof, or mixtures thereof. The crosslinking agent can be a borate crosslinking agent, boric acid, boric oxide, alkali metal borate, alkaline earth metal borate, alkali pyroantimonate, or a mixture thereof. The fluid can further comprise a proppant. The pH of the fracturing fluid can be about 8 to about 12, or any other pH or pH range discussed above. The viscosity of the fluid can be at least about 200 cP at 40 $\sec^{-1}$. After injection, the viscosity can be reduced to less than 200 cP at 40 $\sec^{-1}$. After the viscosity of the fracturing fluid is lowered to an acceptable level, at least a portion of the fracturing fluid can be removed from the formation.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

As described above, a fracturing fluid may include a number of components. Table 2 below exemplifies some preferred compositional ranges for the fluid. It should be understood that compositions outside the indicated ranges are also within the scope of the invention.

TABLE 2

| Component | Exemplary Composition Ranges* | | |
|---|---|---|---|
| | Wide Range (wt %) | Medium Range (wt %) | Narrow Range (wt %) |
| Polymer | 0.1–5.0 | 0.14–1.0 | 0.18–0.6 |
| Active Crosslinking Agent | 0.0001–5.0 | 0.0005–0.1 | 0.002–0.05 |
| Breaking Agent | 0.001–1.0 | 0.005–0.5 | 0.01–0.12 |
| Proppant | 3–300 | 6–180 | 12–96 |
| pH Range | 2–14 | 3–13 | 8–12 |

*note: each weight percentage is based on the total weight of the solvent (e.g., water).

The following examples are presented to illustrate embodiments of the invention. None of the examples is intended, nor should it be construed, to limit the invention as otherwise described and claimed herein. All numerical values are approximate. Numerical ranges, if given, are merely exemplary. Embodiments outside the given numerical ranges may nevertheless fall within the scope of the invention as claimed.

The degree of substitution of a polymer may be measured by any method known in the art. For example, the degree of substitution of a carboxymethyl guar polymer may be obtained by the following procedure.

1. Weigh approximately 8 g of sample into 250 ml Erlenmeyer flask.
2. Add 200 ml of acidified MeOH solution (i.e., 90% methanol and 10% concentrated HCl) and stir for 30 minutes (magnetic stirrer).
3. Vacuum filter on 55 mm Buchner funnel, Whatman GF/C Glass fiber filters (55 mm diameter).
4. Break vacuum. Leave sample in filter funnel. Add approximately 25 ml 80% aqueous isopropyl alcohol to cake. Disperse sample with spatula.
5. Wash sample by suctioning off isopropyl alcohol solution and repeat steps 4 and 5 ten times.
6. Add 25 ml of 99% isopropyl alcohol, disperse cake with spatula, and filter. Repeat 5 times.
7. Repeat step 6, substituting anhydrous methanol for 99% isopropyl alcohol.
8. Dry sample in 105° C. oven, 2 hours.
9. Accurately weigh 2.5 g of dried sample quickly into 500 ml Erlenmeyer flask.
10. Add 15 ml methanol to wet the sample uniformly, then add 250 ml DI water and mix with magnetic stirrer for 10 minutes.
11. Add 10 ml 0.5N NaOH (standardized) by pipette, add 6–8 drops phenolphthalein indicator solution and stir 20 minutes.
12. Titrate the excess NaOH with standard 0.1 HCl. Record volume of HCl as Sample.
13. Prepare a blank by adding 15 ml of methanol, 250 ml DI water, 10 ml 0.5N NaOH, and 6–8 drops phenolphthalein indicator to a 500 ml flask. Titrate to indicator endpoint with 0.1 N HCl. Record the volume of 0.1 N HCl as Blank.
14. Calculate according to the following equations:

$$Y = ((\text{Blank} - \text{Sample}) * N)/W;$$

$$\text{Degree of Substitution} = (0.162 * Y)/((1 - (0.058 * Y)).$$

where Y is milliequivalents of acid functionality/gm sample; B is blank titration in ml; A is sample titration in ml; N is normality of standard HCl solution; and W is the weight of the sample. The degree of substitution of other anionically substituted polymers may be measured in a similar manner or by spectroscopic methods.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Comparison of Polymer Solution Viscosities

Four polymer solutions were prepared as follows. Into 1 liter of rapidly agitated DI water was first added 1.0 ml of a 50% aqueous solution of tetramethylammonium chloride, followed by 4.8 g of guar based polymer. The specific polymers having varying degrees of substitution are defined below in Table 4. Next, 0.024 g of fumaric acid was added, followed by agitation for 2.5 minutes. A portion of the fluid was periodically removed to have the fluid's viscosity measured on a Grace M3500A viscometer at 511 $sec^{-1}$ at about 68° F. (20° C.) for a total of 15 minutes. The viscosity data is presented in Table 4.

TABLE 4

Viscosity comparison results

Viscosity (cP at 511 $sec^{-1}$)

| Polymer | 1 min. | 2 min. | 3 min. | 4 min. | 5 min. | 10 min. | 15 min. |
|---|---|---|---|---|---|---|---|
| Guar | 27.2 | 28.4 | 29.4 | 29.9 | 30.1 | 31.1 | 32.1 |
| 0.03 DS CMG | 16.6 | 19.6 | 20.4 | 21.7 | 22.9 | 26.8 | 28.6 |
| 0.06 DS CMG | 31.1 | 32.3 | 32.9 | 33.3 | 33.5 | 33.7 | 33.7 |
| 0.09 DS CMG | 36.1 | 37.2 | 37.4 | 37.4 | 37.0 | 36.4 | 36.2 |

This data suggests that as the degree of substitution level increases, the polymer solution viscosity also increases. This effect may be due to expansion of the polymer coils. The degree of expansion and rate of viscosity development is proportional to the amount of carboxylation.

Example 2

Effects of Salt Addition

The hydration test was repeated using 2.4 g of polymer and 0.012 g fumaric acid in 1 liter of the fluid described in Example 1, and viscosity measurements were made at 511 $se^{-1}$ with a Fann 35 viscometer. Initially, the polymer solution contained 0.1% v/v aqueous tetramethylammonium chloride (TMAC). Subsequently potassium chloride was added to 2% w/v. The viscosities of the two solutions are presented in Table 5. The percent decline is calculated as the difference between the 0.1% TMAC sample and the 0.1% TMAC+2% KCL sample, divided by the 0.1% TMAC sample, multiplied by 100%.

TABLE 5

Viscosity of solutions containing salts

Viscosity (cP at 511 sec-1)

| Polymer | 0.1% TMAC | 0.1% TMAC + 2% KCL | % Decline |
|---|---|---|---|
| Guar | 12.0 | 12.0 | 0 |
| 0.03 DS CMG | 12.0 | 10.5 | 12.5 |
| 0.06 DS CMG | 13.0 | 11.0 | 15.4 |
| 0.09 DS CMG | 14.0 | 12.0 | 14.3 |

This example shows that the viscosity increases with increasing carboxylation of the polymer. This example also shows that salts tend to neutralize the ionic effects responsible for enhanced polymer chain expansion causing the viscosity to decrease. Notice that the viscosity of guar, a non-ionic polymer, is unaffected by the addition of salt. The collapse of chain expansion and reduction in viscosity due to salt may enhance well clean-up processes after the fracturing treatment as the fracturing fluid becomes contaminated with saline formation water or salts present in the treated formation.

Example 3

Fluid Containing Guar Gum with Degree of Substitution=0

Fracturing fluid was prepared by adding 2.4 g of guar gum (commercially available as GW-4 (without anionic substitution), BJ Services, Houston, Tex.) to 1 liter of deionized water. Afterward, 1 ml of a 50% aqueous tetramethyl ammonium chloride solution was added to the hydrating polymer solution. The polymer solution viscosity was measured with a Fann 35 viscometer and found to have 14.5 cP at 511 $sec^{-1}$. After about 30 minutes, the pH of the fluid was adjusted to 10.45 with a 3.0 ml of 45% aqueous potassium carbonate solution, followed by the addition of 3.0 ml of a sodium tetraborate tetrahydrate in glycerol (XLW-4, available from BJ Services, Houston, Tex.). The boron content of the borate crosslinker was 5.50% as $B_2O_3$.

About 45 g of this solution was weighed into a Fann 50C cup. The cup was then placed on a Fann 50C viscometer and pressured to about 200 psi (14 kg/cm$^2$) with nitrogen. The sample was sheared at 450 $sec^{-1}$ for 2 minutes, followed by a rate sweep using 105, 85, 64, and 42 $sec^{-1}$ for about 2 minutes. The oil bath temperature was pre-set to 180° F. (82° C.) and the bath was raised to submerge the sample cup. The rate sweep was repeated every 30 minutes, and the interim rate between sweeps was 105 $sec^{-1}$. The stresses associated to each rate used in the sweep together with the rates were used to calculate the Power Law indices n' and K'. The n' is referred to as the flow behavior index and the K' is the consistency index in the American Petroleum Institute's Bulletin RP-39. The bulletin also provides a method to calculate the viscosity of a pseudoplastic fracturing fluid using the n' and K' values. The calculated viscosities of the fluid described in this example, as well as the other examples unless otherwise noted, are presented at 40 sec$^{-1}$. The fluid in this example showed an initial viscosity of 352 cP at 40 sec$^{-1}$ at a temperature of 183° F. (84° C.). After 30 minutes, the fluid viscosity remained about 350 cP at 40 sec$^{-1}$ and a pH of 10.4. A viscosity of 200 cP at 40 sec$^{-1}$ is presently preferred to transport proppant during the fracturing treatment. This fluid showed no sign of degrading in the first 30 minutes, but had a relatively lower viscosity than the polymer used in Example 5.

Example 4

Fluid Containing Polymer with Degree of Substitution=0.15

Example 3 was repeated, except that 2.40 g of carboxymethyl guar having a degree of substitution of 0.15 (commercially available as GW-45, BJ Services, Houston, Tex.) was substituted for the guar gum. A volume of 5.0 ml of sodium tetraborate tetrahydrate in glycerol (XLW-4, available from BJ Services, Houston, Tex.) was found to be optimum for this Example. The boron content of the borate crosslinker was 5.50% as $B_2O_3$. The polymer solution was treated as described above and placed in a Fann 50C cup. The polymer solution viscosity was measured with a Fann 35 viscometer and found to have 21.3 cP at 511 sec$^{-1}$. After 30 minutes on the Fann 50, the viscosity was 15 cP at 40 sec$^{-1}$, and after an hour was 16 cP at 40 sec$^{-1}$. The Farm 50 results suggest that little, because of the low viscosity, if any, cross-linking occurred with the borate cross-linker under these conditions.

Example 5

Fluid Containing Polymer with Degree of Substitution=0.04

Example 4 was repeated, except that 2.40 g of carboxymethyl guar having a DS of 0.04 was substituted for the guar gum (the polymer was obtained from Rhone Poulenc, Cranbury, N.J.; sample number SCN 13738). Sodium tetraborate tetrahydrate in glycerol (XLW-4, available from BJ Services, Houston, Tex.) was added to give a boron content of 5.50% as $B_2O_3$. The polymer solution viscosity was measured with a Fann 35 viscometer and found to be 15.6 cP at 511 sec$^{-1}$. The Fann 50 results indicated that after 30 minutes, the viscosity of the polymer solution was 645 cP at 40 sec$^{-1}$, after an hour was 575 cP at 40 sec$^{-1}$, and after two hours was 477 cP at 40 sec$^{-1}$.

It should be noted that the viscosity of the polymer solution of Example 5 was lower than the solution in Example 4, suggesting the molecular weight of the polymer is less than that used in Example 4. However, after 30 minutes on the Fann 50, the cross-linked viscosity was nearly doubled that of Example 3 (using an unsubstituted guar gum) and 43 times higher than Example 4 (using a guar gum with a relatively high degree of substitution).

Example 6

Evaluation of Degree of Substitution Values

In this experiment, various polymers were compared as components in a fracturing fluid. The fluid was prepared by adding 1.0 ml of a 50 weight % aqueous solution of tetramethylammonium chloride and 2.40 g of polymer to 1 liter of rapidly agitated DI water. The polymers were obtained from the Aqualon Division of Hercules (Kenedy, Tex.). Fumaric acid (0.024 g) was added to allow adequate polymer hydration. After 30 minutes of hydration, the polymer solution was treated with 10.0 ml of a 45 wt. % aqueous solution of potassium carbonate to increase the fluid pH to above 10. Lastly, the fluid was treated with 5.0 ml of a borate crosslinker comprised as a diesel slurry containing two borate ores, colemanite and ulexite and supplied by the TBC Brinadd (Houston, Tex.) as FracSal II and contains 21.4% boron measured as $B_2O_3$.

After mixing, 45.0 g of fluid was placed in the sample cup and placed on a Fann 50C viscometer having a couette geometry with R1B5 wetted tools. The rheometer was pressured to 200 psi (14 kg/cm$^2$) with nitrogen and sheared at 100 sec$^{-1}$ while heating to 200° F. (93° C.). Once at temperature, viscosity measurements at 100 sec$^{-1}$ were periodically made. The data is shown below in Table 6. "DS" refers to degree of substitution; "CMG" refers to carboxymethyl guar; and "NDT" refers to No Detectable Torque, suggesting a viscosity of less than 5 cP.

TABLE 6

Comparison of polymers

| Polymer | Viscosity (cP at 100 sec$^{-1}$) | | | | pH |
| --- | --- | --- | --- | --- | --- |
|  | 30 min | 60 min | 90 min | 120 min | Before/After |
| Guar | NDT | NDT | NDT | NDT | 11.1/10.2 |
| 0.03 DS CMG | 91 | 74 | 82 | 60 | 11.1/10.3 |
| 0.06 DS CMG | 231 | 285 | 237 | 268 | 11.2/10.5 |
| 0.09 DS CMG | 266 | 286 | 352 | 329 | 11.2/10.0 |
| 0.15 DS CMG | NDT | 5 | 5 | 5 | 11.2/10.2 |

This example shows that improved viscosity can be obtained using lower concentrations of polymer in the fracturing fluid. Furthermore, the data suggests that improved viscosity of fracturing fluids can be obtained from carboxymethyl guars having degree of substitution values ranging from 0.03 to about 0.09 and crosslinked with borate ions. Polymers having degree of substitution values about 0.15 or more perform poorly, as does guar itself, and do not adequately crosslink with borate based complexors with low amounts of polymer at temperatures above 150° F. (66° C.).

Example 7

Effect of C* Values on Viscosity

In this example, the intrinsic viscosity and C* value of the low degree of substitution polymers were determined. The moisture content of each polymer was determined and dilute solutions were prepared by dissolving about 0.25 g of "active" polymer, accounting for moisture, and 0.012 g fumaric acid in 1 liter of DI water containing 1.0 ml of a 50 weight % aqueous solution of tetramethylammonium chloride. After hydrating overnight, the solutions were further diluted with DI water containing 0.1% by volume tetramethylammonium chloride per liter of water to give polymer solutions of about $2.5 \times 10^{-5}$ g/ml concentration (actual concentration in g/dL shown in Table 7 below).

The intrinsic viscosity was determined using a single point method described in the ASTM procedure D 4603–96, "Standard Test Method for Determining Inherent Viscosity of Poly(Ethylene Terephthalate) (PET) by Glass Capillary Viscometer". The viscosity was measured in a Canon Fenske 100 tube and a constant temperature bath set at 78° F. (26°

C.). The time necessary to drain the tube of 10 ml of the water used to dilute the polymer solutions described above was determined five times ($t_0$). Next, the time required to drain each polymer solution was also measured five times each (t).

The intrinsic viscosity was calculated using equation 1 described in the ASTM method:

$$\text{Intrinsic Viscosity} = 0.25(\mu r - 1 + 3 \ln \mu r)/C \qquad \text{Equation 1}$$

Where $\mu r$=relative viscosity ($t/t_0$); t=average solution flow time (sec); $t_0$=average solvent flow time (sec); and C=polymer solution concentration (g/dL).

Once the intrinsic viscosity was determined, the C* value was calculated using Equation 2:

$$C^* = 2/[\text{Intrinsic Viscosity}] \qquad \text{Equation 2}$$

The factor 2 in the numerator of Equation 2 was found to provide a reasonable estimate of the C* value of carboxymethyl guar polymers. The method reported by Geoffrey Robinson, Simon B. Ross-Murphy and Edwin R. Morris, "Viscosity-Molecular Weight Relationships, Intrinsic Chain Flexibility, and Dynamic Solution Properties of Guar Galactomannan" Carbohydrate Research, 107 (1982) p 17–32 provides a more rigorous method of determination of the C* value. The intrinsic viscosity and C* values of the various polymers are provided in Table 7.

TABLE 7

| Polymer | Conc. For Eq 1 (g/dL) | Intrinsic Viscosity (dL/g) | C* (g/dL) |
| --- | --- | --- | --- |
| Guar | $4.998 \times 10^{-3}$ | 13.24 | — |
| 0.03 DS CMG | $5.001 \times 10^{-3}$ | 14.68 | 0.136 |
| 0.06 DS CMG | $4.993 \times 10^{-3}$ | 18.44 | 0.108 |
| 0.09 DS CMG | $4.999 \times 10^{-3}$ | 22.15 | 0.090 |

These results show favorable results obtained using polymers with degrees of substitution of about 0.03 to about 0.10, and C* values from about 0.08 weight percent to about 0.12 weight percent.

As demonstrated above, embodiments of the invention provide a fracturing fluid and a method of making and using the fracturing fluid. The fracturing fluid in accordance with some embodiments of the invention has improved fracture conductivity due to the use of a borate cross-linking agent. When reduced polymer loading is used, the resulting fracturing fluid may still be cross-linked by a borate or other cross-linking agent. As a result of the reduced polymer loading, less formation damage is caused by the fracturing fluid. The reduced polymer loading may also enhance the fracture conductivity. Moreover, because less polymers are used, the costs associated with well treatments are reduced. Additional characteristics and advantages provided by embodiments of the invention are apparent to those skilled in the art.

While the invention has described with respect to a limited number of embodiments, these embodiments are not intended to limit the scope of the invention as otherwise described and claimed herein. Variations and modifications from the described embodiments exist. For example, although a borate cross-linking agent is exemplified as a preferred cross-linking agent, this does not preclude the use of other types of cross-linking agents, such as antimony-based cross-linking agents. Similarly, although guar polymers are exemplified as preferred polymers in formulating a fracturing fluid, this does not preclude the use of other types of polymers, both synthetic and natural. While the preferred range of the degree of substitution is from about 0.01 to about 0.1, the range may change due to different types of ionic groups. Thus, other ranges of degree of substitution may yield similar or better results. Generally, it is more economical to employ an aqueous fluid to form a fracturing fluid, this does not preclude a non-aqueous fluid being formulated and used in accordance with embodiments of the invention. In cases where water is no longer the predominant component of a fracturing fluid, a hydratable or water-soluble polymer may not be necessary. Instead, other polymers such as water insoluble polymers, may be used. In describing the method of making and using the fracturing fluid, various steps are disclosed. These steps may be practiced in any order or sequence unless otherwise specified. Moreover, one or more steps may be combined into one single step. Conversely, one step may be practiced in two or more sub-steps. Whenever a number is disclosed herein, it should be interpreted to mean "about" or "approximate", regardless of whether these terms are used in describing the number. The appended claims intend to cover all such variations and modifications as failing within the scope of the invention.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A fracturing fluid comprising:
   a liquid;
   a polymer soluble in the liquid, having a degree of substitution of ionic groups of about 0.01 to about 0.1, wherein the polymer is carboxymethyl guar, carboxyethyl guar, carboxypropyl guar, carboxymethyl hydroxypropyl guar, carboxymethyl hydroxyethyl guar, carboxymethyl methyl guar, salts thereof, or mixtures thereof; and
   a boron crosslinking agent or an antimony crosslinking agent, capable of increasing the viscosity of the fracturing fluid by crosslinking the polymer in liquid.

2. The fracturing fluid of claim 1, wherein the liquid is water.

3. The fracturing fluid of claim 1, wherein the antimony crosslinking agent is an alkali pyroantimonate.

4. The fracturing fluid of claim 1, wherein the boron crosslinking agent is boric acid, boric oxide, alkali metal borate, alkaline earth metal borate, or a mixture thereof.

5. The fracturing fluid of claim 1, further comprising a proppant.

6. The fracturing fluid of claim 1, further comprising a breaking agent.

7. The fracturing fluid of claim 1, further comprising a clay stabilizer.

8. The fracturing fluid of claim 1, having a ratio of polymer to liquid of up to about 20 pounds per 1,000 gallons (up to about 2.4 kg per 1,000 liters).

9. The fracturing fluid of claim 1, having a ratio of polymer to liquid of up to about 15 pounds per 1,000 gallons (up to about 1.8 kg per 1,000 liters).

10. The fracturing fluid of claim 1, having a ratio of polymer to liquid of about 40 pounds per 1,000 gallons (about 4.8 kg per 1,000 liters) to about 60 pounds per 1,000 gallons (about 7.2 kg per 1,000 liters).

11. The fracturing fluid of claim 1, having a ratio of polymer to liquid of at least about 20 pounds per 1,000 gallons (at least about 2.4 kg per 1,000 liters).

12. The fracturing fluid of claim 1, wherein the degree of substitution is about 0.02 to about 0.08.

13. The fracturing fluid of claim 1, wherein the degree of substitution is about 0.02 to about 0.04.

14. The fracturing fluid of claim 1, wherein the degree of substitution is about 0.04.

15. The fracturing fluid of claim 1, wherein the polymer has a C* value of about 0.08 weight percent to about 0.12 weight percent.

16. The fracturing fluid of claim 1, wherein the pH of the fracturing fluid is about 3 to about 6.

17. The fracturing fluid of claim 1, wherein the pH of the fracturing fluid is at least about 7.

18. The fracturing fluid of claim 1, wherein the pH of the fracturing fluid is about 8 to about 12.

19. The fracturing fluid of claim 1, wherein the viscosity of the fracturing fluid is at least about 200 cP at 40 sec$^{-1}$.

20. A method of treating a subterranean formation, the method comprising:

obtaining a fracturing fluid comprising a liquid, a polymer soluble in the liquid, having a degree of substitution of ionic groups of about 0.01 to about 0.1, and a boron crosslinking agent or antimony crosslinking agent, capable of increasing the viscosity of the fracturing fluid by crosslinking the polymer in liquid; and injecting the fracturing fluid into a bore hole to contact at least a portion of the subterranean formation;

wherein the polymer is carboxymethyl guar, carboxyethyl guar, carboxypropyl guar, carboxymethyl hydroxypropyl guar, carboxymethyl hydroxyethyl guar, carboxymethyl methyl guar, salts thereof, or mixtures thereof.

21. The method of claim 20, wherein the liquid is waters.

22. The method of claim 20, wherein the antimony crosslinking agent is an alkali pyroantimonate.

23. The method of claim 20, wherein the boron crosslinking agent is boric acid, boric oxide, alkali metal borate, alkaline earth metal borate, or a mixture thereof.

24. The method of claim 20, wherein the fracturing fluid further comprises a proppant.

25. The method of claim 20, wherein the pH of the fracturing fluid is about 8 to about 12.

26. The method of claim 20, wherein the viscosity of the fracturing fluid is at least about 200 cP at 40 sec$^{-1}$.

27. A fracturing fluid comprising:

a liquid;

a polymer soluble in the liquid, having a degree of substitution of ionic groups of about 0.01 to about 0.1; and a boron crosslinking agent capable of increasing the viscosity of the fracturing fluid by crosslinking the polymer in liquid; wherein the boron crosslinking agent is probertite, ulexite, nobleite, growerite, frolovite, colemanite, meyerhofferite, inyoite, priceite, tertschite, ginorite, pinnoite, paternoite, kurnakovite, inderite, preobrazhenskite, hydroboracite, inderborite, kaliborite, or veatchite.

28. The fracturing fluid of claim 27, wherein the liquid is water.

29. The fracturing fluid of claim 27, wherein the polymer is a polysaccharide.

30. The fracturing fluid of claim 27, wherein the polymer is carboxymethyl guar, carboxyethyl guar, carboxypropyl guar, carboxymethyl hydroxypropyl guar, carboxymethyl hydroxyethyl guar, carboxymethyl methyl guar, salts thereof, or mixtures thereof.

31. The fracturing fluid of claim 27, further comprising a proppant.

32. The fracturing fluid of claim 27, further comprising a breaking agent.

33. The fracturing fluid of claim 27, further comprising a clay stabilizer.

34. The fracturing fluid of claim 27, having a ratio of polymer to liquid of up to about 20 pounds per 1,000 gallons (up to about 2.4 kg per 1,000 liters).

35. The fracturing fluid of claim 27, having a ratio of polymer to liquid of up to about 15 pounds per 1,000 gallons (up to about 1.8 kg per 1,000 liters).

36. The fracturing fluid of claim 27, having a ratio of polymer to liquid of about 40 pounds per 1,000 gallons (about 4.8 kg per 1,000 liters) to about 60 pounds per 1,000 gallons (about 7.2 kg per 1,000 liters).

37. The fracturing fluid of claim 27, having a ratio of polymer to liquid of at least about 20 pounds per 1,000 gallons (at least about 2.4 kg per 1,000 liters).

38. The fracturing fluid of claim 27, wherein the degree of substitution is about 0.02 to about 0.08.

39. The fracturing fluid of claim 27, wherein the degree of substitution is about 0.02 to about 0.04.

40. The fracturing fluid of claim 27, wherein the degree of substitution is about 0.04.

41. The fracturing fluid of claim 27, wherein the polymer has a C* value of about 0.08 weight percent to about 0.12 weight percent.

42. The fracturing fluid of claim 27, wherein the pH of the fracturing fluid is about 3 to about 6.

43. The fracturing fluid of claim 27, wherein the pH of the fracturing fluid is at least about 7.

44. The fracturing fluid of claim 27, wherein the pH of the fracturing fluid is about 8 to about 12.

45. The fracturing fluid of claim 27, wherein the viscosity of the fracturing fluid is at least about 200 cP at 40 sec-1.

46. The fracturing fluid of claim 3, wherein the alkali pyroantimonate is a potassium pyroantimonate.

47. The method of claim 22, wherein the alkali pyroantimonate is a potassium pyroantimonate.

* * * * *